United States Patent Office 3,439,070
Patented Apr. 15, 1969

3,439,070
PROCESS FOR PREPARING ALKYL ESTERS OF O,O - DIALKYLDITHIOPHOSPHORYL - α - PHENYLACETIC ESTERS
Giuseppe Losco, Giorgio Rossi, Nicola Troiani, and Romano Santi, Milan, Italy, assignors to Montecatini Edison S.p.A., Milan, Italy, a corporation of Italy
No Drawing. Filed Nov. 26, 1965, Ser. No. 510,079
Claims priority, application Italy, Nov. 26, 1964, 25,292/64
Int. Cl. C07f 9/16
U.S. Cl. 260—971   10 Claims

ABSTRACT OF THE DISCLOSURE

This invention relates to a process of preparing alkyl esters of O,O-dialkyldithiophosphoryl-alpha-phenylacetic acids and particularly the O,O-dimethyl and O,O-diethyl esters. This consists of reacting an alkaline metal or ammonium salt of O,O-dimethyl- or O,O-diethyl-dithiophosphoric acid with an alpha-halo-phenylacetic acid. The O,O-dimethyl- or O,O - diethyldithiophosphoryl - phenylacetic acid thus obtained is then esterified with an alcohol. Compounds wherein R is $CH_3$, when prepared according to the process of the invention, have a lower toxicity toward warm-blooded animals than products obtained according to known processes.

---

Our invention relates to a process of preparing alkyl esters of O,O-dialkyldithiophosphoryl-alpha-phenylacetic acids and particularly the O,O-dimethyl and O,O-diethyl esters.

Patent No. 2,947,662 to Fusco et al. teaches a process for preparing these compounds, which process consists of reacting the alkyl ester of alpha-bromo-alpha-phenylacetic acid with alkaline metal salt of O,O-dimethyl- or O,O-diethyl-dithiophosphoric acid dissolved in a solvent.

An object of our invention is to provide an improved process whereby an improvement is obtained regarding the purity and/or the yields, in the compounds of the general Formula I

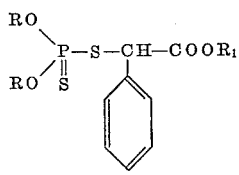

(I)

wherein R is ethyl or methyl, $R_1$=linear or branched chain alkyl containing one to five carbon atoms.

Furthermore, we have noted in compounds wherein R is $CH_3$, when prepared according to the process of our invention, these compounds have a lower toxicity toward warm-blooded animals than products obtained according to the known processes.

The process object of the present invention consists of reacting an alkaline metal or ammonium salt of O,O-dimethyl- or O,O-diethyl-dithiophosphoric acid with an alpha-halo-phenylacetic acid (reaction A). The O,O-dimethyl- or O,O-diethyldithiophosphoryl-phenylacetic acid thus obtained is then esterified with an alcohol (reaction B):

(A)
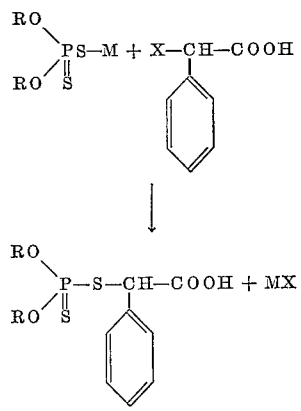

wherein M is an alkaline metal or an ammonium group and X is a halogen.

(B)
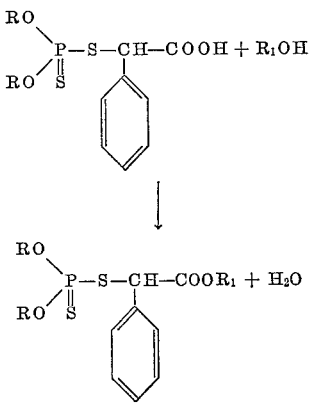

Reaction A can be carried out in the presence of inert organic solvents, water or water inert organic solvent mixtures. In the last two cases, it is preferable to operate at rather low temperature and lower than 50° C. At higher temperatures, the reaction rate increases but, in the presence of water, leads to side reactions, which reduce the yields and the purity of the end product.

If reaction A is carried out in the presence of water, the reaction product, namely the O,O-dimethyldithiophosphoryl-alpha-phenyl-acetic acid, is solvent extracted.

It is convenient to use solvents, insoluble or almost insoluble in water, having a high dissolving power for this acid. It is also preferable, but not essential, to use solvents which form azeotropic mixtures with water so as to make possible transferring the acid solution directly to the esterification stage (reaction B). It is obvious that these requirements, relating to the solvent, are also applicable when reaction (A) is carried out in the presence of mixtures of water-solvent. Many solvents having these requisites can obviously be found in the class of aromatic hydrocarbons and in the class of aliphatic hydrocarbons. Solvents such as carbon tetrachloride, methylene chloride, etc., are suitable.

In the description hereinbelow, reference is made to carbon tetrachloride, without limiting the scope of the invention.

The compounds comprised in the general Formula I can be obtained as follows:

An aqueous solution of an alkaline metal salt of O,O-dimethyl or O,O-diethyl dithio-phosphoric acid is prepared by neutralizing the raw acid, with an alkali in aqueous solution. The fraction of oily liquid which remains undissolved is then removed. The alkaline salt of O,O-dimethyl- or O,O-diethyl-dithiophosphoric acid is now reacted with alpha-bromophenylacetic acid at temperatures beween 15 and 40° C. in a medium consisting of water and carbon tetrachloride. At the end of the reaction, the solution is decanted to give a clear separation in two layers. The upper aqueous layer contains dissolved alkaline bromide, side products and unreacted substances, and the lower layer contains a solution of the O,O-dialkyl-dithiophosphoryl-alpha-phenylacetic acid in carbon tetrachloride.

The lower layer is isolated and washed with water. The alcohol is then added and the esterification is carried out according to the usual esterification techniques. When the esterification is completed, the mixture is sequentially washed with water, with a slightly alkaline solution and then again with water. Finally the solvent is distilled off to give the alkyl ester of O,O-dialkyldithiophosphoryl-alpha-phenyl-acetic acid.

If reaction A is carried out in the presence of water, the O,O-dialkyldithio-phosphoryl-alpha-phenylacetic acid is extracted with carbon tetrachloride, then proceeding as above.

By using polar inert solvents, which dissolve both the starting substances, the reaction proceeds more quickly.

By operating according to the process of the present invention, products having a content of alkylester of O,O-dialkyldithiophosphoryl-alpha-phenylacetic acid of 87–95%, with yields (referred to the product having a purity of 100%) of 75–90% of the theoretical value, in respect of alpha-bromophenyl acetic acid, are obtained.

The improvements obtained are made evident by the comparison with the data that can be obtained from U.S. Patent 2,947,662 granted on August 2, 1960 (or from preparation carried out under the conditions indicated therein), which covers a process for preparing compounds belonging to the same class, consisting of reacting an alkaline or ammonium salt with an alkyl ester of alpha-bromo-alpha-phenylacetic acid.

We have also surprisingly found, and this is a further object of the present invention, that by inserting in the above-described operating cycle a new working step, a further improvement is obtained as regards the purity of the chemical product, accompanied by a substantial decrease of the toxicity to warm-blooded animals.

It has, however, been found that, as said above, the improvement relating to the toxicity to warm-blooded animals is obtained only in compounds having R=methyl.

It is well known to those skilled in the pesticidal art, that in the evaluation of a pesticide, one takes into consideration not only the pesticides' action against parasites, but also its toxicity to warm-blooded animals. This is important not only with respect to the dangers that can be encountered while handling the pesticide during the use but, above all, with the effect that the residues of the pesticides which remain in the substances to be used as foodstuffs, can have on humans. Limits of tolerance for the residues of pesticides have been fixed in various countries, depending on the specific toxicity of each substance. There is, however, a great concern with regard to this, since the effects, over a period of years, of ingestion of even very minute amounts of toxic substances are not completely foreseeable and can vary from one individual to another. There is, therefore, a firm trend to the use of substances which, the effectiveness being the same, have the lowest possible toxicity to warm-blooded animals. It should also be noted that the acquisition of a lower toxicity, by the same product, obviously makes it possible to extend its possible use to fields which otherwise would be barred.

The methyl ester of O,O-dimethyldithiophosphoryl-alpha-phenylacetic acid, obtained by the process according to U.S. Patent No. 2,947,662 has an $LD_{50}$ per os on rat of 145 mg./kg. The same product obtained, on the contrary, according to the process of the present invention, has an $LD_{50}$ per os on rat equal to 500 mg./kg.

The ethylster of O,O-dimethyldithiophosphoryl-alpha-phenylacetic acid prepared according to U.S. Patent 2,947,662 has an $LD_{50}$ per os on rat equal to 50 mg./kg. The product obtained according to the process of the present invention, by operating according to the aforedescribed schemes, has an $LD_{50}$ on rat generally comprised between 200 and 300 mg./kg.

By introducing into the process of the present invention, the new working step reported above, products having an $LD_{50}$ on rat from 500 mg./kg. to 1,100 mg./kg., can be obtained.

The isopropylester of O,O-dimethyldithiophosphoryl-alpha-phenylacetic acid prepared according to U.S. Patent 2,947,662 has an $LD_{50}$ per os on rat equal to 210 mg./kg. The product obtained according to the process claimed here has an $LD_{50}$ per os on rat of 1300 mg./kg.

The new working step mentioned above, assuming that the reaction is carried out between the sodium salt of O,O-dimethyldithiophosphoric acid and alpha-bromophenylacetic acid in the presence of water and carbon tetrachloride, consists of treating the organic phase separated by decantation (after washing with water) with an alkaline aqueous solution to neutral. The aqueous phase separated by decantation, after washing with carbon tetrachloride, is treated with an acid until the O,O-dimethyl-dithiophosphoryl-alpha-phenylacetic acid is completely free, which is then dissolved in carbon tetrachloride. The esterification is then carried out on this solution.

For a better understanding of the process as a whole, a flow-sheet follows:

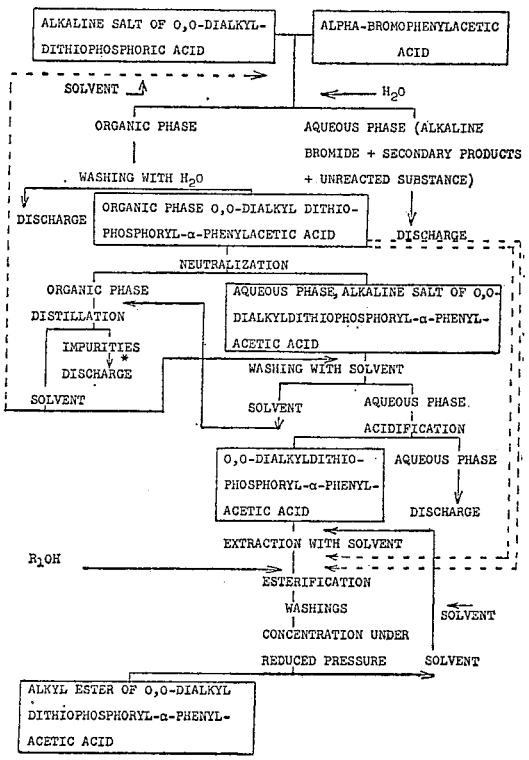

The results obtained show that the relatively high degree of toxicity to warm-blooded animals of alkyls of O,O-dimethyl- or O,O-diethyl-dithiophosphorylphenylacetates obtained according to the known means of the art, is predicated not on the componds per se but rather upon the impurities contained in the commercial product. On the other hand, elimination of the impurities by conventional techniques, is particularly difficult since the products cannot be separated by crystallization and at the temperatures necessary for distillation, they tend to decompose particularly when the operation involves large masses.

The process of our invention also provides a simple and economic purification method, which is also applicable when O,O-dimethyldithiophosphoryl-alpha-phenylacetic acid is obtained through another way.

From what we have said above, it is clear that an object of our present invention is to obtain an alkyl ester of O,O-dialkyl-dithiophosphoryl-alpha-phenylacetic acids with a high degree of purity or with high yields and having a particularly low toxicity to warm-blooded animals.

We have also found that the impurities, which increase the toxicity to warm-blooded animals, have not a particular influence on the activity against parasites, since the activities of highly toxic products are not different from those of low toxicity products as it appears from the data of Table I, reported hereinbelow and relating to samples of products having a different degree of toxicity to warm-blooded animals.

solvent under reduced pressure, 109 g. of slightly colored oil, consisting of the ethyl ester of O,O-dimethyldithiophosphoryl-alpha-phenylacetic acid with a purity of 92.3%, are obtained.

The total yield of the product at 100% purity, with respect to the starting alpha-bromophenylacetic acid, is 78.5%. The acute oral toxicity on rat of the product obtained in this example, expressed as $LD_{50}$, is 250 mg./kg.

Example 2

71.5 (0.33 mol) of bihydrate sodium salt of O,O-dimethyldithiophosphoric acid, dissolved in 150 cc. of acetone, are reacted with 64.5 g. (0.3 mols) of alpha-bromophenylacetic acid for 2 hours, while stirring at 20° C. Thereafter, most of the solvent is eliminated under reduced pressure and 150 cc. of $H_2O$ and 150 cc. of $CCl_4$ are added. The organic phase is separated and washed three times with 150 cc. of $H_2O$. 27.6 g. (0.6 mols) of ethanol and 1.5 g. of p-toluene-sulphonic acid are added to this organic phase containing O,O-dimethyldithiophosphoryl-alpha-phenylacetic acid in order to proceed to the azeotropic esterification. The mixture is now washed twice with 150 cc. of $H_2O$, then with a 2% aqueous

TABLE I

| Compound obtained in Example No. | Musca domestica topic application mortality percent conc. α/mosca in a.s. | | | | | Tetranychus telarius (T. urticae Koch) mortality percent after 24 hrs. conc. percent of a.s. | | | | Aphys fabae mortality percent after 24 hrs. conc., percent of a.s. | | | | |
|---|---|---|---|---|---|---|---|---|---|---|---|---|---|---|
|  | 0.40 | 0.30 | 0.20 | 0.13 | 0.09 | 0.02 | 0.002 | 0.001 | 0.0001 | 0.1 | 0.05 | 0.025 | 0.01 | 0.001 |
| Ex. 1 | 100 | -------- | 97 | 82 | 32 | 100 | 98 | 95 | ---------------- | 100 | 100 | 93 | -------- |  |
| Ex. 6 | 100 | -------- | 95 | 81 | 38 | 100 | 100 | 93 | ---------------- | 100 | 97 | 92 | -------- |  |
| Ex. 7 | 100 | -------- | 95 | 81 | 39 | 100 | 98 | 93 | ---------------- | 99 | 96 | 94 | -------- |  |
| Ex. 2 | 100 | -------- | 97 | 75 | 39 | 100 | 98 | 95 | ---------------- | 99 | 95 | 90 | -------- |  |
| Ex. 8 | 100 | -------- | 97 | 82 | 39 | 100 | 100 | 94 | ---------------- | 100 | 99 | 96 | -------- |  |
| Ex. 9 | 100 | -------- | 97 | 82 | 38 | 100 | 98 | 81 | ---------------- | 100 | 98 | 97 | -------- |  |
| Ex. 3, U.S.P. 2,947,662 | 100 | -------- | 95 | 73 | 29 | 100 | 100 | 99 | ---------------- | 99 | 97 | 95 | -------- |  |
| Ex. 17a |  | 90 | 72 | 42 | 16 |  |  | 100 | 18 | 100 | ---------------- | 94 | 15 |  |
| Ex. 17 |  | 94 | 73 | 50 | 21 |  |  | 100 | 6 | 100 | ---------------- | 99 | 15 |  |
| Ex. 13a | 91 |  | 48 |  |  |  |  | 100 | 9 | 93 | ---------------- | 38 | 6 |  |
| Ex. 18 | 86 | -------- | 47 |  |  |  |  | 99 | 9 | 100 | ---------------- | 52 | 6 |  |

| Compound obtained in Example No. | Calandra granaria mortality percent after 10 days permanence in the treated wheat; conc. p.p.m. of a.s. | | | | | Culex pipiens larvae of 4 days $LD_{50}$ in p.p.m. | Toxicity on rat in mg./kg. |
|---|---|---|---|---|---|---|---|
|  | 1 | 0.56 | 0.4 | 0.28 | 0.2 | 0.14 |  |  |
| Ex. 1 |  | 100 | 99 | 88 | 12 | 8 | ------------------ | 205 |
| Ex. 6 |  | 100 | 99 | 92 | 41 | 6 | ------------------ | 800 |
| Ex. 7 |  | 100 | 99 | 93 | 51 | 6 | ------------------ | 600 |
| Ex. 2 |  | 100 | 100 | 96 | 81 | 15 | ------------------ | 280 |
| Ex. 8 |  | 99 | 98 | 87 | 68 | 9 | ------------------ | 900 |
| Ex. 9 |  | 100 | 98 | 76 | 51 | 8 | ------------------ | 900 |
| Ex. 3, U.S.P. 2,947,662 |  | 99 | 67 | 26 | 10 | 8 | ------------------ | 50 |
| Ex. 17a | 100 | 79 |  | 17 |  |  | 0.008 | 210 |
| Ex. 17 | 100 | 76 |  | 19 |  |  | 0.009 | 1300 |
| Ex. 13a | 100 | 62 |  | 6 |  |  | 0.034 | 145 |
| Ex. 18 | 100 | 47 |  | 7 |  |  | 0.019 | 500 | a.s.=Active substance.
The test on the fly is carried out on adults of *Musca domestica* by topic application.
The test on *Tetranychus telarius* is carried out according to the following modalities: adults acari are sprayed on bean leaves, under standard conditions, with aqueous dispersions of the substances to be tested.
The test on *Aphis fabae* is carried out by spraying a mixed population of *Aphis fabae* scop. on young broad-bean plants, under standard conditions, with aqueous dispersions of the substances to be tested.

For the test on *Calandra granaria*, adults of *Calandra granaria* as transferred on wheat caryopses treated, under standard condition, with powder formulations of the substances to be tested.
The test on larvae of *Culex Pipiens* is carried out by dipping the larvae for 24 hours in water dispersions of the tested products. By effecting the tests at various concentrations a 50% mortality is obtained ($LD_{50}$).

In order to better illustrate the advantage of the present invention in respect of the prior art, we report hereinbelow examples in which the various products are prepared according to the two processes:

Example 1

86 g. (0.4 mols) of alpha-bromophenylacetic acid are added to 222 cc. of an aqueous solution containing 79.3 g. (0.44 mols) of sodium salt of O,O-dimethyldithiophosphoric acid. The mixture is stirred at 30° C. for 5 hours. 240 cc. of $CCl_4$ are added. The organic phase is separated and washed 3 times with 200 cc. of $H_2O$. 36.8 g. of ethanol and 1.5 g. of p-toluene-sulphonic acid are now added to the organic phase, containing O,O-dimethyl-dithiophosphoryl-alpha-phenylacetic acid, in order to proceed to the azeotropic esterification. At the end, it is washed twice with 200 cc. of $H_2O$, then with a 2% $NaHCO_3$ aqueous solution to neutrality and finally with 200 cc. of $H_2O$. After having completely eliminated the $NaHCO_3$ solution till neutral reaction and finally with 150 cc. of $H_2O$. After complete removal of the solvent under reduced pressure, 89.2 g. of a slightly colored oil, consisting of the ethyl ester of O,O-dimethyldithiophosphoryl-alpha-phenylacetic acid, having a purity of 95.8% are obtained.

The total yield of product with 100% purity, with respect to the starting alpha-bromophenylacetic acid, is 88.9% of the theoretical value. The acute oral toxicity on rat of the product obtained in this example, expressed as $LD_{50}$, is 280 mg./kg.

Example 3

I stage.—71.5 g. (0.33 mols) of bihydrate sodium salt of O,O-dimethyldithiophosphoric acid, dissolved in 100 cc. of acetone, are reacted with 64.5 g. (0.3 mols) of alpha-bromophenylacetic acid for 2 hours at 20° C. while stirring. 150 cc. of $H_2O$ and 150 cc. of $CCl_4$ are added. The organic phase is separated, washed twice with 200 cc. of $H_2O$ and reacted with an aqueous $NaHCO_3$ solution till neutrality. The aqueous phase is separated, washed with 50 cc. of $CCl_4$ and acidified with 30 cc. of 66% (w./w.) $H_2SO_4$. The precipitated oil is extracted with 250 cc. of ethyl ether, the ether phase is washed three times with 200 cc. of $H_2O$. By eliminating completely the solvent under reduced pressure, 83.7 g. of a slightly colored oil, consisting of O,O-dimethyldithiophosphoryl-alpha-phenylacetic acid are obtained.

The yield, with respect to the starting alpha-bromophenylacetic acid, is 95.4%.

II stage.—83.7 g. (0.286 mols) of O,O-dimethyldithiophosphoryl-alpha-phenylacetic acid, prepared as described in stage I, dissolved in 150 cc. of $CCl_4$, are azeotropically esterified with 26.3 g. (0.572 mols) of ethanol, using 1.5 g. of p-toluene-sulphonic acid as the catalyst. At the end, the reaction mass is washed twice with 150 cc. of $H_2O$, then with a 2% aqueous $NaHCO_3$ till neutrality and finally with 150 cc. of $H_2O$. The solvent is completely eliminated under reduced pressure thus obtaining 88 g. of a slightly colored oil, consisting of the ethyl ester of O,O-dimethyldithiophosphoryl-alpha-phenylacetic acid having a purity of 98.1%.

The yield of 100% product is 94.1% of the theoretical value, with respect to O,O-dimethyldithio-alpha-phenylacetic acid used. The total yield, with respect to the starting alpha-bromophenylacetic acid, is therefore 89.9% of the theoretical value.

The acute oral toxicity on rat, expressed as $LD_{50}$, of the product obtained in this example is 795 mg./kg. Compared with example wherein the acute oral toxicity on rat ($LD_{50}$) is 250 mg./kg.

Example 4

I stage.—A mixture consisting of 240 cc. of an aqueous solution containing 86.3 g. (0.44 mols) of potassium salt of O,O-dimethyldithiophosphoric acid and of 86 g. (0.4 mols) of alpha-bromophenylacetic acid is reacted while stirring for 5 hours at 30° C. 200 cc. of $CCl_4$ are now added. The organic phase is separated and washed first three times with 200 cc. of $H_2O$ and then reacted with an 8.8% (w./vol.) aqueous $NaHCO_3$ solution till neutrality. The aqueous phase is separated, washed with 50 cc. of $CCl_4$ and acidified with 66% (w./w.) $H_2SO_4$. The precipitated oil is extracted with 250 cc. of ethyl ester, washed three times with 250 cc. of water and dried on $Na_2SO_4$. By completely eliminating the solvent under reduced pressure, 103.3 g. of a straw-yellow oil consisting of O,O-dimethyldithiophosphoryl-alpha-phenylacetic acid are obtained.

Yield=88.4% of the theoretical value, with respect to the starting alpha-bromophenylacetic acid.

II stage.—A solution consisting of 103.3 g. (0.353 mols) of O,O-dimethyldithiophosphoryl-alpha-phenylacetic acid, prepared as described above, and of 73.7 g. (1.6 mols) of ethanol, is saturated at 0° C. with gaseous anhydrous HCl. At the end, the mixture is left to stand at room temperature for about 24 hours. Most of HCl is eliminated under reduced pressure and 100 g. of ground ice and 100 cc. of $CH_2Cl_2$ are added. The organic phase is separated and washed twice with 150 cc. of $H_2O$, and then with a 2% aqueous $NaHCO_3$ solution till neutral reaction and finally with 150 cc. of $H_2O$. By completely eliminating the solvent under reduced pressure, 108.6 g. of slightly colored oil, consisting of the ethyl ester of O,O-dimethyldithiophosphoryl-alpha-phenylacetic acid having a purity of 98.6% are obtained.

The yield of 100% product is 94.6% of the theoretical value, with respect to O,O-dimethyldithiophosphoryl-alpha-phenylacetic acid used. The total yield with respect to the starting alpha-bromophenylacetic acid is therefore 83.6% of the theoretical value. The acute oral toxicity on rat, expressed as $LD_{50}$, of the product obtained in this example is 900 mg./kg.

Example 5

I stage.—A mixture consisting of 160 cc. of an aqueous solution containing 57.8 (0.33 moles) of ammonium salt of O,O-dimethyldithiophosphoric acid and of 64.5 g. of alpha-bromophenylacetic acid (0.3 mols) dissolved in 180 cc. of $CCl_4$ is reacted at 30° C. for 15 hours while stirring. The organic phase is separated, washed with 150 cc. of $H_2O$ and reacted with an 8.8% (w./vol.) aqueous $NaHCO_3$ solution till neutral reaction. The aqueous phase is separated, washed with 50 cc. of $CCl_4$ and acidified with 30 cc. of 66% (w./w.) $H_2SO_4$. The precipitated oil is extracted with 250 cc. of ethyl ether and the ether solution is washed three times with 200 cc. of $H_2O$. By completely eliminating the solvent under reduced pressure, 78.4 g. of a straw-yellow oil, consisting of O,O-dimethyl-dithiophosphoryl-alpha-phenylacetic acid are obtained.

Yield=89.4 of the theoretical value, with respect to the starting alpha-bromophenylacetic acid.

II stage.—78.4 g. (0.268 mols) of O,O-dimethyldithiophosphoryl-alpha-phenylacetic acid prepared as described above, dissolved in 100 cc. of $CCl_4$, are azeotropically esterified with 24.6 g. (0.536 mols) of ethanol by using 1.5 g. of p-toluene-sulphonic acid as the catalyst. At the end of the esterification, the reaction mass is washed twice with 100 cc. of $H_2O$, then with a 2% aqueous $NaHCO_3$ solution till neutral reaction and finally with 100 cc. of $H_2O$. The reaction mass is dried over $Na_2SO_4$ and the solvent is completely removed under reduced pressure. 81.8 g. of a slightly colored oil, consisting of the ethyl ester of O,O-dimethyldithiophosphoryl-alpha-phenylacetic acid having a purity of 98.5%, are thus obtained.

The yield of 100% product is 93.8% of the theoretical yield, with respect to O,O-dimethyldithiophosphoryl-alpha-phenylacetic acid used. The total yield, with respect to the starting alpha-bromophenyl-acetic acid, is therefore 83.8% of the theoretical yield. The acute oral toxicity on rat of the product obtained in this example, expressed as $LD_{50}$, is 1,100 mg./kg.

Example 6

I stage.—86 g. (0.4 mols) of alpha-bromophenylacetic acid dissolved in 170 cc. of benzene are added to 222 cc. of an aqueous solution containing 79.3 g. (0.44 mols) of sodium salt of O,O-dimethyldithiophosphoric acid while agitating within 1 hour, keeping the temperature at 30° C. The mixture is stirred for 21 hours at this temperature. The benzene phase is separated, an additional 180 cc. of benzene are added and the whole is washed three times with 200 cc. of $H_2O$ and is then reacted with an 8.8% (w./vol.) aqueous $NaHCO_3$ solution till neutral reaction (382 cc. of solution, corresponding to 33.6 g. of $NaHCO_3$ are required). The aqueous phase is separated, washed with 50 cc. of benzene and acidified with 40 cc. of 66% (w./w.) $H_2SO_4$. The precipitated oil is extracted with 250 cc. of ethyl ether. The ether phase is washed with 100 cc. of $H_2O$ and dried on $Na_2SO_4$. The solvent is then completely eliminated under reduced pressure. 106.5 g. of a straw-yellow oil, consisting of O,O-dimethyldithiophosphoryl - alpha - phenylacetic acid are obtained.

Yield=91.1% of the theoretical yield with respect to the starting alpha-bromophenylacetic acid.

II stage.—75.5 g. (0.258 mols) of O,O-dimethyldithiophosphoryl-alpha-phenylacetic acid prepared as described above, dissolved in 250 cc. of benzene, are azeotropically esterified with 34 g. (0.74 mols) of ethanol, by using 2.5 g. of p-toluene-sulphonic acid as the catalyst. At the end of the esterification, the reaction mass is washed twice with 100 cc. of $H_2O$, then with a 2% aqueous $NaHCO_3$ solution till neutral reaction and finally with 100 cc. of $H_2O$. It is then dried on $Na_2SO_4$ and the solvent is completely eliminated under reduced pressure. 75 g. of a slightly colored oil consisting of the ethyl ester of O,O- dimethyldithiophosphoryl-alpha-phenylacetic acid having a purity of 94% are obtained.

The yield of 100% product is 85.2% of the theoretical yield in respect of the O,O-dimethyldithiophosphoryl-alpha-phenylacetic acid is used. The total yield in respect of the starting alpha-bromophenylacetic acid is therefore $(91.1 \times 85.2) = 77.6\%$ of the theoretical yield. The acute oral toxicity on rat of the product obtained in this example, expressed as $LD_{50}$, is 800 mg./kg.

Example 7

A mixture consisting of 222 cc. of an aqueous solution containing 79.3 g. (0.44 mols) of sodium salt of O,O-dimethyldithiophosphoric acid and of 86 g. of alpha-bromophenylacetic acid (0.4 mols) dissolved in 240 cc. of $CCl_4$, is reacted at 30° C. for 23 hours while stirring. The organic phase is then separated and washed three times with 200 cc. of $H_2O$ and is thereafter reacted with an aqueous 8.8% (w./vol.) $NaHCO_3$ solution till neutrality (382 cc. are required). The aqueous phase is separated, washed with 50 cc. of $CCl_4$ and acidified with 40 cc. of 66% (w./w.) $H_2SO_4$. The precipitated oil is extracted with 75 cc. of $CCl_4$. 34 g. (0.74 mols) of ethanol and 1.5 g. of para-toluene-sulphonic acid are added to this solution containing 108.8 g. (0.372 mols) of O,O-dimethyldithiophosphoryl-alpha-phenylacetic acid in order to proceed to the azeotropic esterification. The reaction mass is washed twice with 100 cc. of $H_2O$, then with 2% aqueous $NaHCO_3$ solution till neutral reaction and finally with 100 cc. of $H_2O$. By completely eliminating the solvent under reduced pressure, 113.9 g. of a slightly colored oil, consisting of the ethyl ester of O,O-dimethyldithiophosphoryl-alpha-phenylacetic acid having a purity of 96.5% are obtained.

The total yield of product having 100% purity with respect to the starting alpha-bromophenylacetic acid is 85.8%. The acute oral toxicity on rat of the product obtained in this example, expressed as $LD_{50}$, is 600 mg./kg.

Example 8

I stage.—A mixture consisting of 222 cc. of an aqueous solution containing 79.3 g. (0.44 mols) of sodium salt of O,O-dimethyldithiophosphoric acid and 86 g. of alpha-bromophenylacetic acid (0.4 mols) dissolved in 130 cc. of $CH_2Cl_2$ is reacted at 30° C. for 20 hours while stirring. The organic phase is then separated and washed twice with 200 cc. of $H_2O$. The washed phase is then reacted with an 8.8% (w./vol.) aqueous $NaHCO_3$ solution till neutrality (382 cc. of solution corresponding to 33.6 g. of $NaHCO_3$ are required). The aqueous phase is separated, washed with 50 cc. of $CH_2Cl_2$ and acidified with 40 cc. of 66% (w./w.) $H_2SO_4$. The precipitated oil is extracted with 250 cc. of ethyl ether, the ether phase is washed three times with 200 cc. of $H_2O$ and dried on $Na_2SO_4$. By completely eliminating the solvent under reduced pressure 106 g. of a slightly colored oil, consisting of O,O-dimethyldithiophosphoryl - alpha - phenylacetic acid are obtained.

The yield with respect to alpha-bromophenylacetic acid is 90.7% of the theoretical value.

II stage.—97 g. (0.331 mols) of O,O-dimethyl-dithiophosphoryl-alpha-phenylacetic acid prepared as described above, dissolved in 70 cc. of $CCl_4$, are azeotropically esterified with 30.3 g. (0.658 mols) of ethanol by using 1.5 g. of p-toluene-sulphonic acid as a catalyst. At the end of the esterification, the mixture is washed twice with 100 cc. of $H_2O$, then with a 2% aqueous $NaHCO_3$ solution till neutral reaction and finally with 100 cc. of $H_2O$. By completely eliminating the solvent under reduced pressure, 101.5 g. of a slightly yellow oil, consisting of the ethyl ester of O,O - dimethyldithiophosphoryl-alpha-phenylacetic acid having a purity 94.7%, are obtained.

The yield of 100% product is 90.4% of the theoretical value with respect to the starting O,O-dimethyldithiophosphoryl-alpha-phenylacetic acid. The total yield with respect to the starting alpha-bromophenylacetic acid is therefore $(94.7 \times 90.4) = 85.6\%$ of the theoretical value. The acute oral toxicity on rat of the product obtained in this example, expressed as $LD_{50}$, is 900 mg./kg.

Example 9

I stage.—A mixture consisting of 222 cc. of an aqueous solution containing 79.3 g. (0.44 mols) of sodium salt of O,O-dimethyldithiophosphoric acid and of 86 g. (0.4 mols) of alpha-bromophenylacetic acid, dissolved in 240 cc. of $CCl_4$, is reacted for 20 hours at 30° C. The organic phase is separated, washed three times with 200 cc. of $H_2O$ and then reacted with a 2 N aqueous NaOH solution till neutral reaction (203 cc. of 2 N NaOH are required). The aqueous phase is separated, washed with 50 cc. of $CCl_4$ and acidified with 40 cc. of 66% (w./w.) $H_2SO_4$. The precipitated oil is extracted with 250 cc. of ethyl ether. The ether solution is washed three times with 200 cc. of $H_2O$ and dried on $Na_2SO_4$. By completely eliminating the solvent under reduced pressure, 106 g. of a slightly colored oil, consisting of O,O-dimethyldithiophosphoryl-alpha-phenylacetic acid, is obtained.

Yield=90.7%.

II stage.—92.7 g. (0.317 mols) of O,O-dimethyldithiophosphoryl - alpha - phenylacetic acid, prepared as described above, dissolved in 70 cc. of $CCl_4$ are azetropically esterified with 29 g. (0.631 mols) of ethanol by using 1.5 g. of p-toluene-sulphonic acid as the catalyst. At reaction end, the mixture is washed twice with 100 cc. of $H_2O$. By completely eliminating the solvent under reduced pressure, 89.8 g. of an almost colorless oil, consisting of the ethyl ester of O,O-dimethyldithiophosphoryl-alpha-phenylacetic acid having a purity of 96.8%, are obtained.

The yield of 100% product is 85.6% of the theoretical value with respect to O,O-dimethyldithiophosphoryl-alpha-phenyl-acetic acid used. The total yield with respect to the starting alpha-bromophenylacetic acid is therefore $(90.6 \times 85.6) = 77.6\%$ of the theoretical value. The acute oral toxicity on rat of the product obtained according to this example, expressed as $LD_{50}$, is 900 mg./kg.

Example 10 (according to the present invention)

A mixture consisting of 820 cc. of an aqueous solution containing 458 g. (2.2 mols) of sodium salt of O,O-diethyldithiophosphoric acid and of 430.1 g. of alpha-bromophenylacetic acid, dissolved in 1,200 cc. of $CCl_4$, is reacted, while stirring, for 20 hours at 30° C. The organic phase is then separated and washed three times with 1 liter of $H_2O$. After having completely eliminated the solvent under reduced pressure, 632.6 g. of solid product having a melting point of 79–81° C., consisting of O,O-diethyldithiophosphoryl-alpha-phenylacetic acid are obtained.

Yield=98.7% of the theoretical value with respect to alpha-bromophenylacetic acid used.

96.1 g. (0.3 mols) of O,O-diethyldithiophosphoryl-alpha-phenylacetic acid prepared as above, dissolved in 120 cc. of $CCl_4$, are azeotropically esterified with 27.6 g. (0.6 mols) of ethanol by using 1.5 g. of p-toluene-sulphonic acid as the catalyst. At the end of the esterification, the reaction mass is first washed with 200 cc. of $H_2O$, then with an aqueous 2% $NaHCO_3$ solution till neutral reaction and finally with 200 cc. of $H_2O$. After having completely eliminated the solvent under reduced pressure, 95.5 g. of an oily liquid, consisting of the ethyl ester of O,O-diethyldithiophosphoryl-alpha-phenylacetic acid having a purity of 94.3% are obtained.

The yield of product at 100% is 86.2% of the theoretical value with respect to O,O-diethyldithiophosphoryl-alpha-phenylacetic acid. The total yield with respect to the starting alpha-bromophenylacetic acid is therefore 85.1% of the theoretical value. The acute oral toxicity on rat of the product obtained in this example, expressed as $LD_{50}$, is 120 mg./kg.

Example 10a (according to U.S. 2,947,662)

20 g. of diethyldithiophosphoric acid, dissolved in 100 cc. of acetone, are neutralized with about 6 g. of anhydrous sodium carbonate. After half an hour of stirring at room temperature, 25 g. of ethyl alpha-bromo-alpha-phenylacetate are added. After one night most of the solvent is distilled off slowly under ordinary pressure. The cooled residue is shaken with water and with a 5% NaHCO₃ solution till pH of 7. It is then dried on MgSO₄ and subjected to distillation, collecting the fraction boiling at 149–150° C. under 0.05 mm./hg.

About 20 g. of a straw-yellow oil containing 81.79% of

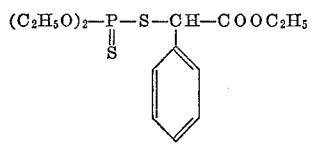

are obtained.

The yield with respect to the alpha-bromophenylacetic ester=45.6%.

Yield in respect of alpha-bromophenylacetic acid (since the esterification yield is 99%)=45.14%.

The acute oral toxicity on rat of the product obtained in this example is $LD_{50}$=120 mg./kg.

Example 11 (according to the present invention)

96.1 g. (0.3 mols) of O,O-diethyldithiophosphoryl-alpha-phenylacetic acid, prepared as in Example 10, dissolved in 120 cc. of CCl₄, are azeotropically esterified with 24.5 g. (0.33 mols) of normal butyl alcohol, using 1.5 g. of p-toluene-sulfonic acid as the catalyst. At the end of the esterification, the reaction mass is washed first with 200 cc. of H₂O, then with an aqueous 2% NaHCO₃ solution till neutral reaction and finally with 200 cc. of H₂O. After having completely eliminated the solvent under reduced pressure, 107.2 g. of an oily liquid, consisting of the n-butyl ester of O,O-diethyldithiophosphoryl-alpha-phenylacetic acid having a purity of 95.80%, are obtained.

The yield of 100% product is 90.9% of the theoretical value in respect of the O,O-diethyldithiophosphoryl-alpha-phenylacetic acid used. The total yield in respect of the starting alpha-bromophenylacetic acid is therefore 89.7% of the theoretical value. The acute oral toxicity on rat of the product obtained in this example, expressed in $LD_{50}$=280 mg./kg.

Example 11a (according to U.S. 2,947,662)

A mixture consisting of 32.1 g. (0.143 mols) of potassium salt of O,O-diethyldithiophosphoric acid dissolved in 45 cc. of H₂O and of 35.2 g. (0.13 mols) of n-butyl ester of alpha-bromophenylacetic acid dissolved in 55 g. of acetone is reacted, while agitating, for 8 hours at 30° C. 100 cc. of ethyl ether are then added. The organic phase is separated and washed twice with 100 cc. of H₂O. After having completely eliminated the solvent under reduced pressure, 45.8 g. of an oily liquid consisting of

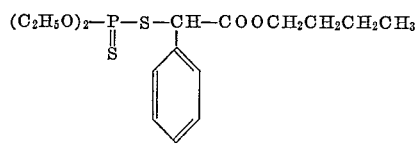

having a purity of 94.35% are obtained.

The yield of 100% product is 88.3% of the theoretical value with respect to n-butyl ester of alpha-bromophenylacetic acid employed and 79.3% with respect to bromophenylacetic acid since the esterification yield of acid alpha-bromophenylacetic acid with butyl alcohol is 90%. The acute oral toxicity on rat of the product obtained in this example, expressed in $LD_{50}$=165 mg./kg.

Example 12 (according to the present invention)

96.1 g. (0.3 mols) of O,O-diethylidthiophosphoryl-alpha-phenylacetic acid, prepared as in Example 10, dissolved in 120 cc. of CCl₄ are azeotropically esterified with 29.1 g. (0.33 mols) of isoamyl alcohol, by using 1.5 g. of para-toluene-sulfonic acid as catalyst. At the end of the esterification, the reaction mass is washed first 200 cc. of H₂O, then with an aqueous 2% NaHCO₃ solution till neutrality and finally with 200 cc. of H₂O. After having completely eliminated the solvent under reduced pressure, 115.1 g. of an oily liquid consisting of the isoamyl ester of O,O-diethyldithiophosphoryl-alpha-phenylacetic acid having a purity of 93.4% are obtained.

The yield of 100% product is 91.8% of the theoretical value in respect of acid O,O-diethyldithiophosphoryl-alpha-phenylacetic acid used. The total yield in respect of the starting alpha-bromophenylacetic acid is therefore 90.6% of the theoretical value. The acute oral toxicity on rat of the compound obtained in the present example, expressed in $LD_{50}$, is 280 mg./kg.

Example 12a (according to U.S. 2,947,662)

A mixture consisting of 67.3 g. (0.3 mols) of potassium salt of O,O-diethyldithiophosphoric acid, dissolved in 95 cc. of H₂O and of 78 g. (0.274 mols) of isoamylester of alpha-bromophenlyacetic acid dissolved in 120 cc. of acetone is reacted, while agitating for 7 hours at 30° C. 200 cc. of ethyl ether are then added. The organic phase is separated and washed twice with 200 cc. of H₂O. After having completely eliminated the solvent under reduced pressure, 101.2 g. of an oily liquid consisting of

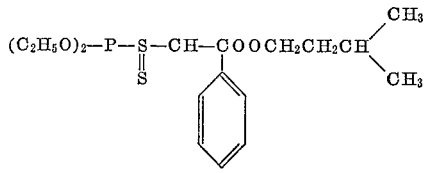

having a purity of 96.58%, are obtained.

The yield of 100% products is of 91.3% of the theoretical value with respect to the isoamyl ester of alpha-bromophenylacetic acid used and 83.5% with respect to alpha-bromophenylacetic acid since the esterification yield is of 91.5%. The acute oral toxicity on rat of the compound obtained in this example, expressed in $LD_{50}$=135 mg./kg.

Example 13 (according to the present invention)

A mixture consisting of 190 cc. of aqueous solution containing 79.3 g. (0.44 mols) of sodium salt of O,O-dimethyldithiophosphoric acid and of 86 g. (0.4 mols) of alpha-bromophenylacetic acid, dissolved in 240 cc. of CCl₄, is reacted while agitating for 18 hours at 30° C. The organic phase is then separated and washed three times with 200 cc. of H₂O. 25.6 g. (0.8 mols) of methyl alcohol and 1.5 g. of p-toluene-sulfonic acid are added to the organic phase, which contains O,O-dimethyldithiophosphoryl-alpha-phenylacetic acid, to proceed to the azeotropic esterification. The product resulting from the esterification is washed twice with 200 cc. of H₂O, then with an aqueous 2% NaHCO₃ solution till neutral reaction and finally with 200 cc. of H₂O. After having completely eliminated the solvent under reduced pressure, 104 g. of an oily liquid consisting of the methyl ester of O,O-dimethyldithiophosphoryl-alpha-phenylacetic acid having a purity of 89.4%, are obtained.

The total yield of product having a purity of 100%, with respect to the starting alpha-bromophenylacetic acid, is 75.9% of the theoretical value. The acute oral toxicity on rat of the compound obtained in this example, expressed in $LD_{50}$, is 254 mg./kg.

Example 13a (according to U.S. 2,947,662)

29 g. of raw dimethyldithiophosphoric acid dissolved in 150 cc. of dioxane are neutralized with 10 g. of anhydrous sodium carbonate. The whole is agitated for half an hour and 37.5 g. of methyl alpha-bromo-alpha-phenylacetate are added. The whole is heated to 70–80° C. for 2 hours. After one night, NaBr is filtered off and the filtrate is diluted with water. The oil separated is dried over MgSO₄. 40 g. of a straw-yellow oil are obtained, which by distillation at 0.15 mm. Hg, give 30 g. of product containing 83.1% of

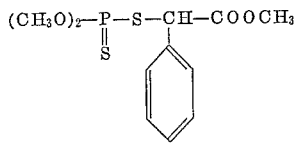

The yield with respect to the methyl ester of alpha-bromophenylacetic acid is 49.7% of the theoretical value. The yield with respect to alpha-bromophenylacetic acid is 48.7% since the esterification yield is 98%. The acute oral toxicity on rat of the compound obtained in this example, expressed in LD₅₀, is 145 mg./kg.

Example 14 (according to the present invention)

I stage.—A mixture consisting of 410 cc. of aqueous solution containing 229 g. (1.1 mols) of sodium salt of O,O-diethyldithiophosphoric acid and 215 g. of alpha-bromophenylacetic acid dissolved in 600 cc. of CCl₄, is reacted while agitating for 20 hours at 30° C. The organic phase is then separated, washed three times with 500 cc. of H₂O and reacted with aqueous 8.8% weight/volume NaHCO₃ solution till neutral reaction. The aqueous phase is separated, washed with 200 cc. of CCl₄, and acidified with 100 cc. of 66% (w./w.) H₂SO₄. The solid thus formed is collected on a filter, washed with H₂O and dried at 45–50° C. till constant weight. 297 g. of a white solid product having a melting point of 83–85.5° C. and consisting of O,O-diethyldithiophosphoryl-alpha-phenylacetic, are obtained.

The yield is 92.7% of the theoretical value in respect of alpha-bromophenylacetic acid.

II stage.—96.1 g. (0.3 mols) of O,O-diethyldithiophosphoyl-alpha-phenylacetic acid, prepared as above, dissolved in 120 cc. of CCl₄ are azeotropically esterified with 27.6 (0.6 mols) of ethyl-alcohol using 1.5 g. of p-toluene-sulfonic acid as catalyst. At the end of the esterification, the reaction mass is washed first with 200 cc. of H₂O, then with an aqueous 2% NaHCO₃ solution till neutrality and finally with 200 cc. of H₂O. After having completely eliminated the solvent, under reduced pressure, 102.7 g. of an oily liquid consisting of the ethyl ester of O,O-diethyldithiophosphoryl-alpha-phenylacetic acid having a purity of 98.4% are obtained.

The yield of 100% product is 96.7% of the theoretical value with respect to the O,O-diethyldithiophosphoryl-alpha-phenylacetic acid used.

The total yield with respect to the starting alpha-bromophenylacetic acid is 89.7% of the theoretical value.

The acute oral toxicity on rat of the compound obtained in this example, expressed in LD₅₀, is 130 mg./kg.

Example 15 (according to the present invention)

96.1 g. (0.3 mole) of O,O-diethyldithiophosphoryl-alpha-phenylacetic acid, prepared as in Example 10, dissolved in 120 cc. of CCl₄ are azeotropically esterified with 24.5 g. (0.33 mol) of ni-butyl alcohol using 1.5 g. of p-toluene-sulfonic acid as the catalyst. At the end of the esterification, the reaction mass is washed first with 200 cc. of H₂O, then with an aqueous 2% NaHCO₃ solution till neutral reaction, and finally with 200 cc. of H₂O. After having completely eliminated the solvent under reduced pressure, 108.5 g. of an oily liquid consiting of the n-butyl ester of O,O-diethyldithiophosphoryl-alpha-phenylacetic acid having a purity of 97% are obtained.

The yield of 100% product is 93.3% of theoretical with respect to the O,O-diethyldithiophosphoryl-alpha-phenylacetic acid used. The total yield, with respect to the starting bromophenylacetic acid is therefore 86.5% of theoretical.

The acute oral toxicity on rat of the compound obtained in this example, expressed in LD₅₀ is 228 mg./kg.

Example 16 (according to the present invention)

96.1 g. (0.3 mole) of O,O-diethyldithiophosphoryl-alpha-phenylacetic acid, prepared as in Example 10, dissolved in 120 cc. of CCl₄, are azeotropically esterified with 29.1 (0.33 mol) of isoamyl alcohol by using 1.5 g. of p-toluene-sulfonic acid as catalyst.

By operating as shown in Examples 14 and 15, 115 g. of a yellow oily liquid consisting of the isoamyl ester of O,O-diethyldithiophosphoryl-alpha-phenylacetic having a purity of 96.2% are obtained.

The yield of 100% product is 94.5% of theoretical with respect to O,O-diethyldithiophosphoryl-alpha-phenylacetic acid is used. The total yield, with respect to the starting bromophenylacetic acid is 87.6% of the theoretical value. The acute oral toxicity on rat of the compound obtained in this example in LD₅₀ is 310 mg./kg.

Example 17 (according to the present invention)

A mixture consisting of 19 liters of an aqueous solution containing 7.924 kg. (44 mols) of sodium salt of O,O-dimethyldithiophosphoric acid and of 8.600 kg. (40 mols) of alpha-bromophenylacetic acid dissolved in 24 liters of CCl₄ is reacted while agitating for 18 hours at 30° C. The organic phase is then separated, washed three times with 15 liters of H₂O and reacted with an aqueous 8.8% (weight/vol.) NaHCO₃ solution till neutral reaction. The separated aqueous phase, after washing with 5 liters of CCl₄ is acidified with 4 liters of 66% (w./w.) H₂SO₄. The precipitated oil is extracted with 18 liters of CCl₄ and the resulting organic phase is washed twice with 15 liters of H₂O. 3 kg. (50 mols) of isopropyl alcohol and 150 g. of p-toluene-sulfonic acid are added to this solution, which contains 11.050 kg. (37.8 mols) of O,O-dimethyldithiophosphoryl-alpha-phenylacetic acid, to proceed to the azeotropic esterification. The liquid resulting from the esterification is washed twice with 10 liters of H₂O, then with a 2% aqueous NaHCO₃ solution till neutral reaction and finally with 10 liters of H₂O. After having completely eliminated the solvent under reduced pressure, 11.740 kg. of an oily liquid consisting of the isopropyl ester of O,O - dimethyldithiophosphoryl - alpha - phenylacetic acid having a purity of 94.5%, are obtained.

The total yield of 100% product with respect to the starting alpha-bromophenylacetic acid is 82.9%. The acute oral toxicity on rat of the product obtained according to this example, expressed in LD₅₀, is 1300 mg./kg.

Example 17a (according to U.S. 2,947,662)

A mixture consisting of 200 cc. of an aqueous solution containing 82.5 g. (0.458 mol) of sodium salt of O,O-dimethyldithiophosphoric acid and of 107.3 g. (0.417 mol) of isopropyl ester of alpha-bromophenylacetic acid, dissolved in 330 cc. of acetone, is reacted while agitating for 6 hours at 30° C. 200 cc. of ethyl ether are then added. The organic phase is separated and washed twice with 200 cc. of H₂O.

After having completely eliminated the solvent under reduced pressure, 131.5 g. of an oily liquid consisting of

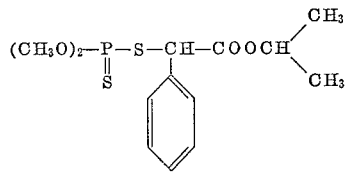

having a purity of 92.6%, are obtained.

The yield of 100% product is 87.3% of theoretical with respect to the isopropyl ester of alpha-bromophenylacetic acid used and of 81.9% with respect to alpha-bromophenylacetic acid since the esterification yield is 93.1%.

The acute oral toxicity on rat of the compound obtained in this example, expressed in $LD_{50}$, is 210 mg./kg.

Example 18

105.4 g. (0.36 mol) of purified O,O-dimethyldithiophosphoryl-alpha-phenylacetic acid dissolved in 100 cc. of $CCl_4$ are azeotropically esterified with 23.1 g. (0.72 mol) of methyl alcohol by using 1.5 g. of p-toluene-sulfonic acid as catalyst. At the end of the esterification, the reaction mass is washed first was 200 cc. of $H_2O$, then with a 2% aqueous $NaHCO_3$ solution till neutral reaction, and finally with 200 cc. of $H_2O$. After having completely eliminated the solvent under reduced pressure, 100 g. of an oily liquid, slightly yellow, colored, consisting of the methyl ester of O,O - dimethyldithiophosphoryl - alpha - phenylacetic acid having a purity of 93.8%, are obtained.

The yield of 100% product is 85.1% of theoretical with respect to the O,O-dimethyldithiophosphoryl alpha-phenylacetic acid used. The acute oral toxicity on rat of the compound obtained in this example, expressed in $LD_{50}$, is 500 mg./kg.

The examples appearing hereinabove are illustratory only and not limitive of the invention. It would be obvious to one skilled in the art that the invention can be practiced other than as specifically described. The term "alkaline metal salt" as used in the claims includes the ammonium salt which is not a true alkaline metal salt.

We claim:

1. A process for preparing dithiophosphoric esters of the Formula I

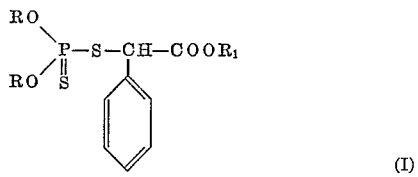

wherein R is methyl or ethyl and $R_1$ is a linear or branched hydrocarbon chain containing 1 to 5 carbon atoms, which comprises reacting an alkaline metal salt of an acid selected from the group consisting of O,O-dimethyl- and O,O-diethyldithiophosphoric acid with an alpha-bromo-phenylacetic acid in the presence of a solvent and at a temperature below 50° C., to yield in a first stage O,O-dialkyldithiophosphoryl - alpha - phenylacetic acid, and esterifying in a second stage said O,O-dialkyldithiophosphoryl-alpha-phenylacetic acid obtained.

2. The process of claim 1 wherein the reaction between the alkaline metal salt of O,O-dialkyldithiophoshoric acid and alpha-bromo-alpha-phenylacetic acid is carried out in the presence of a solvent for both the substances in reaction.

3. The process of claim 2 wherein the solvent used is acetone and the temperature is between 15 and 30° C.

4. The process of claim 1 wherein the reaction between the salt of O,O-dialkyldithiophosphoric acid and the alpha-bromo-alpha-phenylacetic acid is carried out in the presence of water and a chlorinated aliphatic solvent.

5. The process of claim 4 whrein the reaction is carried out at tempeartures comprised between 15° and 35° C.

6. The process of claim 1 wherein an aqueous solution of an alkaline metal salt of O,O-dialkyldithiophosphoryl-alpha-phenylacetic acid is first prepared, and O,O-dialkyldithiophosphoryl-alpha-phenylacetic acid is freed from this solution by addition of a sulfuric acid and then esterified with an alcohol.

7. The process of claim 6, wherein the aqueous phase containing the alkaline metal salt of O,O-dialkyldithiophosphoryl-alpha-phenylacetic acid, is washed with a solvent, the O,O-dialkyldithiophosphoryl-alpha-phenylacetic acid is freed by acidification, separated from the aqueous phase, extracted with a solvent, and esterified with an alcohol.

8. The process of claim 7 wherein the O,O-dialkyldithiophosphoryl-alpha-phenylacetic acid, dissolved in a carbon tetrachloride, is transferred to the esterification with an alcohol.

9. The process according to claim 7 wherein the esterification is carried out by saturating a solution of O,O-dimethyl- or O,O - diethyldithiophosphoryl-alpha-phenylacetic acid in an alcohol with gaseous HCl at 0° C.

10. A process for preparing dithiophosphoric esters of the Formula I

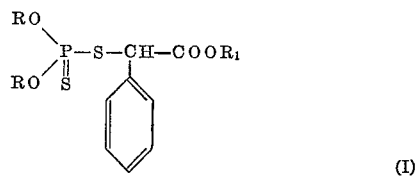

wherein R is methyl or ethyl and $R_1$ is a linear or branched hydrocarbon chain containing 1 to 5 carbon atoms, which comprises reacting an ammonium salt of an acid selected from the group consisting of O,O-dimethyl- and O,O-diethyldithiophosphoric acid with an alpha-bromo-phenylacetic acid in the presence of a solvent, to yield in a first stage O,O - dialkyldithiophosphoryl-alpha-phenylacetic acid, and esterifying in a second stage said O,O-dialkyldithiophosphoryl - alpha - phenylacetic acid obtained.

References Cited

UNITED STATES PATENTS 3,076,009   1/1963   Schrader et al.
3,157,686   11/1964   Pohlemann et al.
3,185,723   5/1965   Floyd.

CHARLES B. PARKER, Primary Examiner.

ANTON H. SUTTO, Assistant Examiner.

U.S. Cl. X.R.

260—941, 979